Oct. 6, 1936.                    E. A. SLYE                      2,056,690
                              COUNTER MECHANISM
                          Filed March 24, 1930          2 Sheets-Sheet 1
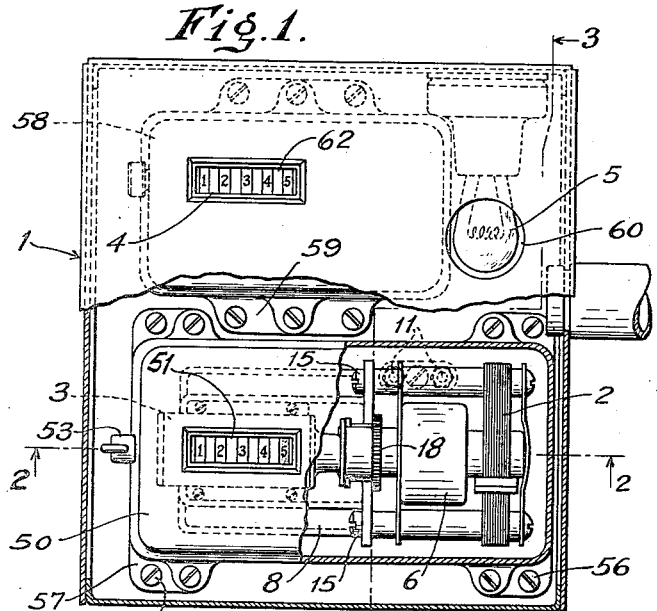
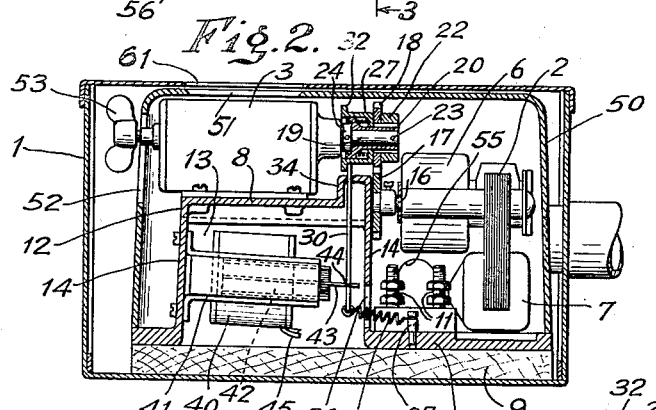
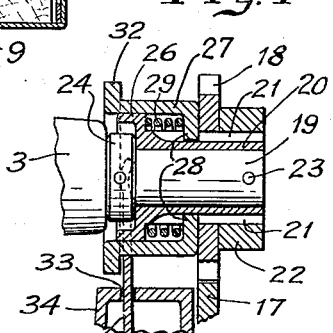
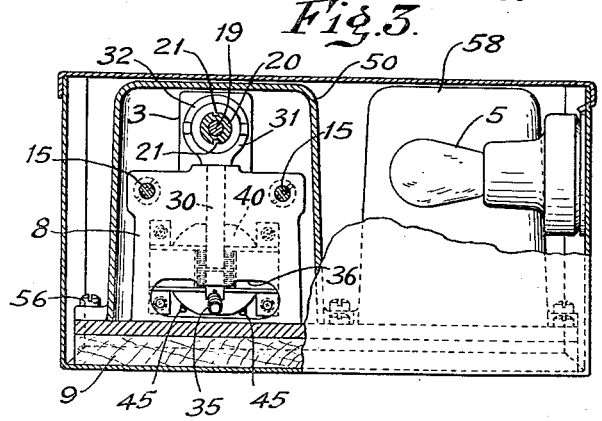
INVENTOR
EDWARD A. SLYE
BY
ATTORNEY.

Oct. 6, 1936.    E. A. SLYE    2,056,690
COUNTER MECHANISM
Filed March 24, 1930    2 Sheets-Sheet 2
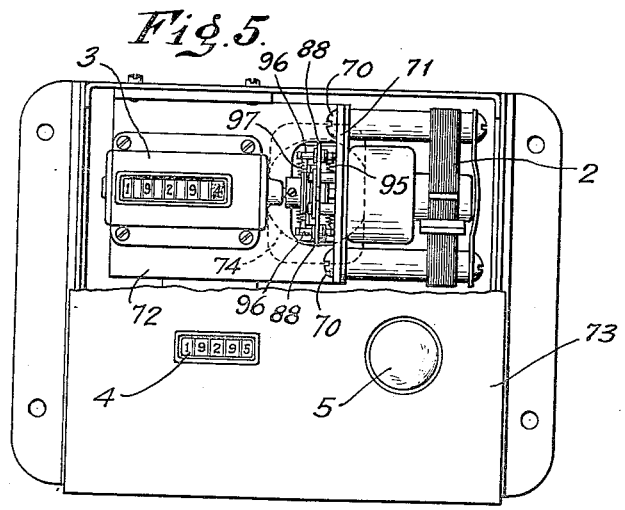
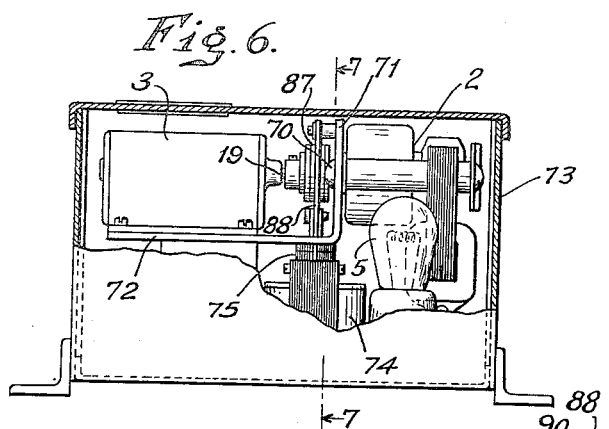
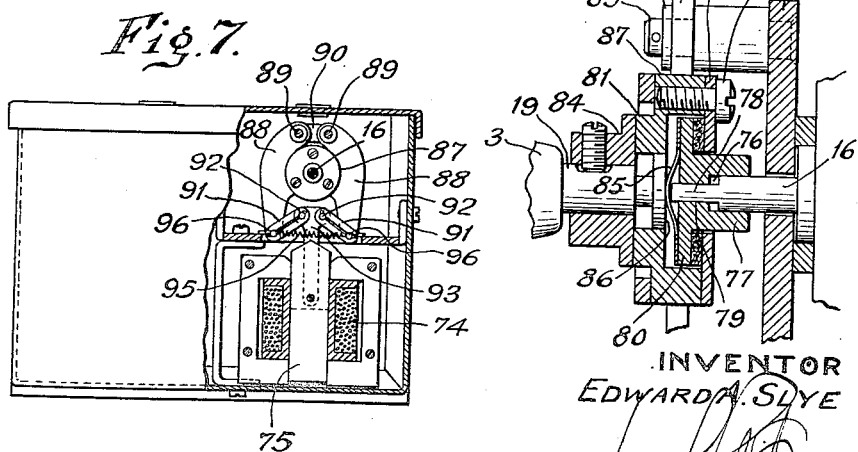
INVENTOR
EDWARD A. SLYE
BY
ATTORNEY.

Patented Oct. 6, 1936

2,056,690

UNITED STATES PATENT OFFICE 2,056,690

COUNTER MECHANISM

Edward A. Slye, East Hartford, Conn., assignor to Veeder-Root Incorporated, a corporation of Connecticut Application March 24, 1930, Serial No. 438,317

17 Claims. (Cl. 235—92)

My invention relates to counter mechanisms. It has for its object to provide an improved counter mechanism, and more particularly an improved counter mechanism of the type adapted to be operated by a synchronous motor to total the operating time of an intermittently operating device or mechanism. A further object of my invention is to provide improved connecting and disconnecting means between the synchronous motor and the counter whereby the tendency of the motor to cause the counter to coast with it after the current supply to the motor has been shut off is obviated, and more accurate counting is thereby obtained. Still further objects of my invention are to provide improved driving means, and more particularly, improved frictional driving means between the counter and the synchronous motor and movable to connect or disconnect the same, and improved controlling means, and more particularly improved electric controlling means controlling the operation of these driving means. These and other objects and advantages of my improved construction will, however, hereinafter more fully appear.

In the accompanying drawings I have shown, for purposes of illustration, two embodiments which my invention may assume in practice.

In these drawings,—

Figure 1 is a face view of a counter unit, portions of the covers being broken away to facilitate illustration;

Fig. 2 is a partial sectional view on line 2—2 of Fig. 1;

Fig. 3 is a partial section on line 3—3 of Fig. 1;

Fig. 4 is an enlarged detail view of the friction mechanism;

Fig. 5 is a view generally similar to Fig. 1 but showing a modified construction;

Fig. 6 is a side elevation of the counter and connected motor construction shown at the top of Fig. 5;

Fig. 7 is a partial transverse sectional view taken substantially on line 7—7 of Fig. 6;

Fig. 8 is an enlarged detail view of the friction clutch mechanism shown in Figs. 5 to 7, and Fig. 9 is a wiring diagram showing the circuit connections for the elements of the counter unit.

It will be noted that herein I have shown a counter unit of a type adapted to be connected to an intermittently operative mechanism, this unit herein comprising an outer casing 1 having therein a suitable synchronous motor adapted to be supplied with current only when the mechanism is operating and herein generally indicated at 2, and this motor 2 driving a counter 3 totaling the operating time of the intermittently operative mechanism, while an electromagnetically operated counter counting the number of operations of said mechanism and generally indicated at 4, and a lamp 5 constituting a telltale, are also enclosed in the casing 1 and both connected in parallel across the motor leads in a usual manner in counter units of the above type. It will be understood, since the electromagnetically operated counter 4 is connected across the motor leads and thus is energized and counts the number of successive energizations of the motor, that its reading also affords an accurate indication of the number of operations of the intermittently operative mechanism which operates concurrently with and controls the energization of the motor. An electromagnetically operated counter suitable for the purpose is shown in Fig. 4 of the Yoder Patent No. 787,969, patented April 25, 1905.

Referring more particularly to my improved construction shown in Figs. 1 to 4, it will be noted that the synchronous motor illustrated is in the form of a well known "Telechron" motor having a self starting armature 6 rotatable whenever its coil 7 is connected with a 60-cycle alternating current line, as for example, by the operations of the intermittently operative device. This motor 2 herein, together with the counter 3, is carried on a supporting hollow casting 8 adapted to be disposed on a suitable support 9 inside the casing 1 and on the back wall of the latter. Herein, this casting 8 has a base portion 10 underlying the motor 2 and the terminals 11 therefor, and also has a raised portion 12 carrying the counter 3 so that the axis of the latter is disposed above the axis of the motor armature. It will also be noted that the casting provides a chamber 13 beneath the counter support 12 and also has opposite, substantially vertical walls 14 of which the wall adjacent the motor 2 carries the latter on motor supporting screws 15.

In this preferred construction, as distinguished from directly connecting the shafts of the synchronous motor and counter, I provide gearing between the same and also an improved adjustable clutch mechanism controlling the connection of one of the gears of said gearing to the counter and associating this mechanism with the gear on the counter shaft although obviously it may be associated with the gear on the motor shaft if desired. More particularly, it will be noted that the armature shaft 16 of the motor 2 herein has fixed thereto a spur gear 17, which in turn meshes with another spur gear 18 of the same diameter but suitably bushed and coaxial with the shaft 19 of the counter 3. This shaft 19 herein has a sleeve 20 thereon which forms a bearing for the gear 18 on which the latter is freely rotatable independently of the shaft 19, and also has oppositely located longitudinal grooves 21 extending through the gear 18 and into a collar 22 on the end of the shaft 19, this collar 22 with the sleeve 20 being fixed to the shaft 19 by a common pin 23. Herein, this shaft 19 also carries adjacent the end of the counter casing, another collar 24 pinned to the shaft and acting to position the sleeve 20, while the latter also has an outer flange 26 abutting against and partially enclosing this collar 24. It should be noted that the gear 18 is free from any positive connection with sleeve 20, being normally free to rotate thereon. Means are provided, however, releasably to connect said sleeve 20 and gear 18 for conjoint rotation, thus to drive shaft 19 of the counter. As shown, a tubular clutch member or cup 27 also encloses the flange 26 and a portion of the sleeve 20 and has oppositely located projections 28 disposed in and slidable longitudinally of the grooves 21 in the sleeve 20, while the end of the member 27 is engageable frictionally in one position with the adjacent side of the gear 18. Also, a coiled spring 29 encircles the sleeve 20 within the member 27 and has one end acting on the flange 26 on the sleeve 20 and the other end acting on the oppositely disposed inner face of the member 27, so that the spring 29 normally tends to force the member 27 into engagement with the gear 18. Thus, it will be noted that whenever the spring 29 is permitted to press the end of the clutch member 27 into engagement with the gear 18, the shaft 19 of the counter 3 will be rotated through the friction drive thus provided and the engagement of the members 28 on the clutch member 27 with the grooves 21 in the sleeve 20 fixed to the shaft 19. When, however, the clutch member 27 is moved to the left (Figs. 2 and 4), this friction drive is interrupted in such manner as, while permitting the gear 18 to continue to rotate on sleeve 20, immediately to disconnect the drive of the counter shaft 19.

Associated with this improved friction drive, are improved mechanical controlling means therefor. Herein, these include a lever 30 having a bifurcated upper end 31 engaging a flange 32 on the clutch member 27, and also a downwardly extending body portion which passes through, near its upper end, a fulcrum slot 33 in a raised portion 34 on the top of the casting 8. Also, the lower end of this lever is connected by a coiled spring 35, herein extending through an aperture 36 in the bottom of one wall 14 of the casting 8, to a suitable upstanding pin 37 on the portion 10 of the casting. It will here also be noted that this spring 35 normally holds the lever 30 in the position shown in Fig. 2, wherein the clutch member 27 is disconnected from the gear 18. Thus, the construction is such that whenever it is desired to connect the friction drive and begin to count, it is only necessary to pull the lower end of the lever 30 to the left against the spring 35, whereupon, the spring 29 then being released, it will force the member 27 to the right into engagement with the gear 18, and thereby establish a frictional driving connection for the counter shaft 19. This driving connection will also obviously be interrupted immediately whenever the lower end of the lever 30 is released, the spring 35 then pulling that end of the lever to the right and thereby forcing its upper end to the left to shift the member 27 to the left and thereby interrupt the friction drive thereof by the gear 18. It will also be noted that the bifurcated end 31 of the member 30 then acts as a spring pressed friction brake against the flange 32, in such manner as to bring the counter shaft 19 promptly to rest, irrespective of the coasting of the gear 18.

Associated with this controlling mechanism is also improved automatic actuating mechanism. Herein, this mechanism is of the electric type and includes a solenoid operative to control the movement of the lever 30. More particularly, the solenoid has a coil 40 carried on a suitable support 41 projecting laterally from the left hand wall 14 of the casting 8 (Fig. 2) and underneath the counter supporting portion 12, and also has a core 42 moving in the coil 40 and support 41 and which, when coil 40 is not energized, is urged by the retractile spring 35 into a position in which it is partially withdrawn from the zone comprising the effective magnetic field of coil 40. Herein, this core 42 also carries a projecting member 43, which in turn has a slot 44 therein through which the lower end of the lever 30 is extended; herein at a point adjacent but slightly above the connection of the latter lever to the spring 35. Here it will also be understood that conductors 45 connected to the coil 40 extend through the aperture 36 in the casting on opposite sides of the spring 35, and are connected to the motor terminals 11, carried on the base of the synchronous motor 2, to provide a connection in parallel to the latter. Thus, it will be evident that when current is supplied to the synchronous motor 2 and the latter is thus started in operation, current will be simultaneously supplied to the coil 40 in such manner as to cause the latter to suck in its core 42 and consequently pull its member 43 to the left (Fig. 2) against the action of spring 35 and thereby move the upper end of the lever 30 in such manner as to permit the spring 29 to force the member 27 into engagement with the gear 18 and thereby establish a frictional drive between that gear and the counter 3. When, however, the current flow to the motor is interrupted, current flow is simultaneously interrupted to the coil 40 and the spring 35 is then free to pull the lower end of the lever 30 to the right and thereby, through the engagement of its bifurcated upper end with the flange 32 on the clutch member 27, force that member to the left and act as a brake thereon in such manner as promptly to interrupt counting on the counter, irrespective of whether the gear 18 continues to rotate. From the above description it will be clear that the drive to the counter is interrupted whenever the motor is deenergized and that the counter is consequently disconnected from the motor whenever the latter is coasting following deenergization.

Referring to the mounting of the mechanism in the casing 1, it will be noted that an inner removable casing member 50 is provided in this construction inside the casing 1 in the form of a dome of substantially rectangular horizontal cross section which is adapted to fit over and enclose the motor 2 and counter 3 together with the associated mechanism hereinbefore described. This member 50 herein has an aperture 51 in its top which permits the counter 3 to be read through the casing. It also has a slot 52 in one end through which the re-setting member 53 of that counter extends, this aperture preferably being of such shape as to permit the cover 50 to be removed, if desired, without removing this member 53. It will also be noted that a slot 55 is provided in the side of the member 50 adjacent the electromagnetic counter 4 and lamp 5 to permit the terminals of the latter to be connected in the usual parallel relation to the motor. Attention is also directed to the attaching means including lugs and screws 56 projecting from the base of the member 50 and attaching the same on a supplementary base 57, which in turn is attached to the insulating base 9.

As regards the remainder of the mechanism, attention is also directed to the casing member 58 for the magnetic counter 4, which is generally similar to the member 50 and provided with a corresponding reading aperture in its top and conductor aperture in its side, and similarly connected to a base member 59, corresponding to the member 57. It will, moreover, be noted that the lamp 5 is herein supported on an end wall of the casing I so that it projects at right angles to the electromagnetic counter casing 58 and at one end of the latter, and that the lamp is visible through a suitable opening 60 in the face of the casing I, while the indicating mechanisms of the counters 3 and 4 are visible through suitable apertures 61 and 62 in that casing.

In operation, it is believed that it will be obvious from the above description that whenever current is supplied to the motor 2, the coil 40, through its core 42 and connected mechanism, will cause the clutch member 27 to be actuated in such manner as to release the brake 31 and permit the spring 29 to connect the member 27 to the gear 18, and accordingly begin counting simultaneously with the beginning of motor rotation. When, however, current flow to the motor is interrupted, as when the intermittently operative device completes an operation, current flow will similarly be interrupted through the coil 40. The spring 35 will then throw the lever 30 reversely, in such manner as to move the member 27 out of frictional engagement with the gear 18 and thereby interrupt the drive of the counter and brake the same simultaneously with the interruption of the current flow to the coil 40. Thus, it will be observed that, irrespective of whether or not, due to the high speed of operation of the motor 2, the gear 18 continues to rotate for a few seconds after current flow to the motor has been interrupted, the counter is disconnected and stopped simultaneously with the interruption of current flow to the motor, in such manner as to provide an accurate count and avoid the inaccuracies which otherwise would enter the count due to coasting of the motor each time that its current supply is cut off.

In Figs. 5 to 8, a modified construction is illustrated, wherein, while utilizing a frictional drive and a spring and solenoid control for the same, the mechanism is of different construction and differently arranged. Thus, for example, it will be noted that in this form of construction the motor shaft and the counter shaft are directly connected, i. e. without intermediate gears, and that controlling mechanism is shown which is specifically different from that heretofore described, while the arrangement of the mechanism in the casing and the structure of the casing are also different from that previously described. It will also be noted that while a synchronous motor 2 is used, similar to that previously described, this motor is connected by screws 70 to an upstanding flange 71 on a bracket 72 carrying the counter 3, and that both of these elements are disposed in the upper rather than the lower part of a casing 73, while the electromagnetic indicator 4 and lamp 5 are herein disposed in the same relative position that the counter 3 and motor 2 were disposed in the previous construction. Attention is also directed to the fact that a solenoid is disposed directly beneath the connecting and disconnecting means rather than beneath the counter, with the coil 74 of the solenoid horizontally disposed and the core 75 thereof operating vertically.

As regards the driving connections, it will be noted that herein the shaft 19 of the counter 3 is disposed coaxially with the shaft 16 of the motor 2 and that the latter shaft carries longitudinally adjustable means for connecting or disconnecting these shafts. Also, it will be observed that the shaft 16 extends through the portion 71 of the bracket 72 and rotates freely therein. The outer end of this shaft 16 also extends into a suitable aperture 76 in a cooperating driving member 77 and has a reduced portion 78 extending through a suitable aperture 79 in that member. Moreover, it will be noted that a friction flange 80 carrying a suitable friction band or disc is provided on the member 77 and rotatable with or independently of an outer casing, herein comprising a member 81 and a cooperating friction flange or member 82 connected thereto by screws 83 and fixed to and rotatable with the shaft 19, as by suitable carrying means 84. Attention is also directed to the fact that an annular bowed spring 85 acts between an annular surface 86 on the member 81 and the back of the flange 80, while the outside of the member 81 forms a hub or drum 87.

Associated with this hub is also solenoid controlled controlling mechanism of a different type and adapted to grip or release the same herein including a pair of gripping members 88 pivoted at spaced points 89 on suitable studs projecting from the member 71, and herein connected by a link 90. These members 88 in turn also have at their lower ends pivoted links 91 pivoted at 92 to opposite sides of the upper end of an extension 93 carried by the solenoid core 75. Also it will be noted that a coiled spring 95 connects the pivot pins 96 of these links 91 to the members 88. Preferably, a corresponding spring 97 is also disposed between the opposite ends of the pivot pins 96 on the opposite side of the members 88, as shown in Fig. 5.

Considering the operation of this construction, it will be evident that when current flow is established through the motor 2 and simultaneously through the coil 74 of the solenoid, the core 75 of the latter will be sucked in in such manner as to pull down the member 93 and straighten the toggle provided by the links 91 between the members 88, and thereby cause the latter members to release the drum surface 87. When this occurs, the flanges 80 and 82 will be engaged frictionally by the spring 85 to such an extent as to cause the member 81 to be rotated and the counter 3 operated. However, when the current supply to the coil 74 is interrupted simultaneously with the current supply to the motor 2, the spring 95, or springs 95 and 97, will break the toggle and bring the members 88 into frictional engagement with the drum surface 87 in such manner as to brake the member 81 and thereby interrupt the counter drive and stop the counter while permitting the member 77 to rotate independently thereof.

As a result of my improved construction, it is made possible not only to insure a correct count of the operating time in each operation of the device to which the mechanism is connected, but to provide a correct total of the operating time at the end of the day, irrespective of whether the device has been operated many times during the day, the elimination of the error in each individual operation automatically eliminating the multiplication of that error by the number of times which the device is operated, which otherwise would make the error at the end of the day very substantial indeed. Attention is also directed to the fact that either of my improved constructions is readily adapted to embodiment in existing mechanisms of the type described, since it requires no change other than in the counter unit. It will also be noted that certain features of my improved construction may be utilized to obtain effective and accurate counting when it is desired to have the constant speed shaft, herein the shaft 16 of the motor 2, continue to rotate and to connect the time counter intermittently to this shaft, the clutch and brake controlling member 30 and its associated mechanism described in connection with the first form of my invention being adapted to provide an effective controlling member under such circumstances and being adapted to be operated electrically by its solenoid, or, if desired, manually operated. These and other advantages of my invention will, however, be clearly apparent to those skilled in the art.

While I have in this application specifically described two forms which my invention may assume in practice, it will be understood that these forms are shown herein for illustrative purposes only and that the invention may be further modified and embodied in various other forms without departing from its spirit or the scope of the appended claims.

What I claim as new and desire to secure by Letters Patent is:—

1. In a counting mechanism, a rotary electric motor adapted to coast before stopping, a self-starting counter driven thereby, and counter drive interrupting means for automatically maintaining the counter drive interrupted during coasting of said motor.

2. In a counting mechanism, a synchronous electric motor adapted to coast before stopping, a self-starting counter driven thereby, and counter drive controlling means for automatically disconnecting and stopping said counter while permitting said motor to continue to rotate during coasting.

3. In a counting mechanism, a self-starting synchronous electric motor adapted to coast before stopping, a counter, and counter driving mechanism therebetween adjustable to interrupt the counter drive and including stopping means for said counter automatically adjustable with said mechanism upon said adjustment of the latter.

4. In a counting mechanism, a self-starting synchronous electric motor adapted to coast before stopping, a counter, driving connections therebetween having cooperating driving members, and means for automatically separating said members to interrupt the counter drive whenever the motor is coasting.

5. In a counting mechanism, a self-starting synchronous electric motor adapted to coast before stopping, a counter, driving connections therebetween having cooperating frictional driving members, and means for automatically braking the member connected to said counter upon disconnection of said member from the other member.

6. In a counting mechanism, a self-starting rotary electric motor, a counter driven thereby, and electrically operated means operated upon energizing and deenergizing said motor and controlling the connection of said motor and counter.

7. In a counting mechanism, a self-starting synchronous electric motor adapted to coast before stopping, a counter, driving connections therebetween, and controlling means automatically operative to stop said counter upon cessation of current flow to said motor and while said motor coasts.

8. In a counting mechanism, a self-starting synchronous electric motor having a rotor adapted to coast before stopping, a counter, driving connections therebetween, and means for stopping said counter in advance of said motor having a controlling coil connected in the motor circuit.

9. In a counting mechanism, a self-starting synchronous electric motor having a rotor adapted to coast before stopping, a counter, frictional driving connections between said rotor and counter, and spring connected means automatically braking during coasting the element of said friction drive connected to said counter.

10. In a counting mechanism, a self-starting synchronous electric motor having a rotor adapted to coast before stopping, a counter, driving connections between said rotor and counter, and counter drive controlling means including a brake member operative upon cessation of current flow to said motor to interrupt said counter drive and actuate said brake member to brake the counter.

11. In a counting mechanism, a self-starting synchronous electric motor having a rotor adapted to coast before stopping, a counter, gearing between said rotor and counter having gears connected to each of the same, clutch and brake mechanism controlling said counter and between the same and its gear, and means for controlling said mechanism to disconnect and brake said counter whenever said motor is coasting.

12. In a counting mechanism, a self-starting synchronous rotary electric motor having a rotor adapted to coast before stopping, a counter, gearing between said rotor and counter including gears connected to each of the latter, clutch and brake mechanism controlling said counter and between the same and its gear and having an operating member, and a coil controlling the movement of said member and connected in the motor circuit.

13. The combination with an electric circuit which is intermittently energized, a self-starting electric motor energized concurrently with said circuit having a free running rotor which coasts after the motor is de-energized, a counter driven by said rotor, and means automatically arresting the counter operation simultaneously with the de-energization of the motor.

14. In a counting mechanism, a frame having an upstanding portion and a laterally extending portion, a self-starting synchronous electric motor carried by said upstanding portion, a counter carried by said laterally extending portion, driving connections between said motor and counter, and means controlling said connections having a controlling coil disposed below said laterally extending portion.

15. In combination, a self-starting synchronous electric driving motor having a rotating shaft, driven mechanism having a shaft adapted to be driven by said motor shaft, operative connections between said shafts including a clutch and means normally holding the latter in disconnected position and normally braking said driven shaft, and means connected in the motor circuit for overpowering said clutch holding and braking means during current flow to said motor and releasing the same upon cessation of said flow.

16. In combination, a self-starting synchronous electric clock motor having a rotating shaft, a counter having a shaft adapted to be driven by said motor shaft, gearing between said shafts having a gear freely rotatable by said motor shaft relative to the counter shaft, friction mechanism for connecting said gear to said counter shaft, braking mechanism for said counter shaft automatically operative upon disconnection of said friction mechanism from said gear, and electric control means for said friction and braking mechanisms connected in the motor circuit.

17. In combination, a self-starting synchronous electric clock motor having a rotating shaft, a counter having a shaft adapted to be driven by said motor shaft, said shafts being coaxially disposed, friction mechanism between the adjacent ends of said shafts normally operative to drive the counter shaft with said motor shaft, and mechanism for braking an element of said friction mechanism which moves with said counter shaft while permitting continued rotation of the motor shaft comprising braking means frictionally engaging said element and electric controlling means for said braking means in circuit with the motor.

EDWARD A. SLYE.

CERTIFICATE OF CORRECTION.

Patent No. 2,056,690.                                                                October 6, 1936.

EDWARD A. SLYE.

It is hereby certified that error appears in the printed specification of the above numbered patent requiring correction as follows: Page 1, second column, line 51, after the word "shaft", and page 3, second column, line 40, after "same" insert a comma; page 4, first column, line 45-46 and line 52, claims 1 and 2 respectively, strike out the hyphenated word "self-starting" and insert the same before "rotary" in line 44, claim 1, and before "synchronous" in line 50, claim 2; and that the said Letters Patent should be read with these corrections therein that the same may conform to the record of the case in the Patent Office.

Signed and sealed this 2nd day of February, A. D. 1937.

(Seal)

Leslie Frazer
Acting Commissioner of Patents.